(12) United States Patent
Crowthers et al.

(10) Patent No.: US 9,195,778 B2
(45) Date of Patent: Nov. 24, 2015

(54) SYSTEMS, METHODS, AND APPARATUS FOR PREFETCHING NODE DATA FOR LINKED DATA STRUCTURE TRAVERSAL

(71) Applicant: Qualcomm Innovation Center, Inc., San Diego, CA (US)

(72) Inventors: Lucas L. Crowthers, Raleigh, NC (US); Kulanthaivel Palanichamy, San Diego, CA (US); Shyama Prasad Mondal, San Diego, CA (US); Subrato K. De, San Diego, CA (US)

(73) Assignee: Qualcomm Innvoation Center, Inc., San Diego, CA (US)

( * ) Notice: Subject to any disclaimer, the term of this patent is extended or adjusted under 35 U.S.C. 154(b) by 504 days.

(21) Appl. No.: 13/786,125

(22) Filed: Mar. 5, 2013

(65) Prior Publication Data

US 2014/0258340 A1    Sep. 11, 2014

(51) Int. Cl.
*G06F 17/30*    (2006.01)

(52) U.S. Cl.
CPC .... *G06F 17/30961* (2013.01); *G06F 17/30908* (2013.01)

(58) Field of Classification Search
CPC ..................... G06F 17/30908; G06F 17/30961
USPC ......................................................... 707/792
See application file for complete search history.

(56) References Cited

U.S. PATENT DOCUMENTS

| 7,975,025 | B1 * | 7/2011 | Szabo | G06F 17/30902 709/203 |
|---|---|---|---|---|
| 8,180,763 | B2 * | 5/2012 | Freedman | G06F 17/30961 707/713 |
| 8,645,501 | B2 * | 2/2014 | Ghosh | H04L 61/1511 709/203 |
| 2003/0126116 | A1 | 7/2003 | Chen et al. | |
| 2007/0106848 | A1 * | 5/2007 | Krishnaiyer | G06F 9/383 711/137 |
| 2012/0136875 | A1 * | 5/2012 | Pan | G06F 17/3053 707/748 |
| 2012/0284372 | A1 * | 11/2012 | Ghosh | H04L 61/1511 709/219 |
| 2014/0053057 | A1 * | 2/2014 | Reshadi | G06F 17/2247 715/234 |

OTHER PUBLICATIONS

Article entitled "Prefetching J+-Tree: A Cache-Optimized Main Memory Database Index Structure", by Luan et al, dated Mar. 3, 2009.*
Article entitled "Efficient In-Memory Indexing with Generalized Prefix Trees", by Boehm et al., dated 2011.*

(Continued)

*Primary Examiner* — Mahesh Dwivedi
(74) *Attorney, Agent, or Firm* — Neugeboren O'Dowd PC

(57) ABSTRACT

Systems, methods, and apparatus are herein disclosed for prefetching node data of a linked data structure into a processor's cache so as to decrease linked data structure traversal latency. In particular, as the linked data structure is created or modified, forward and reverse prefetch nodes are identified and links identifying locations of these nodes are written to nodes that will be traversed N nodes prior to the prefetch nodes. Once the linked data structure has been created, traversals of the structure use the prefetch links to prefetch node data into the processor cache, so that when traversal reaches a node, that node's data is read from processor cache rather than from memory.

20 Claims, 9 Drawing Sheets

(56) References Cited

OTHER PUBLICATIONS

Chen, et al., "Fractal Prefetching B+Trees: Optimizing Both Cache and Disk Performance," ACM SIGMOD, Jun. 4-6, 2002, Madison, WI, 12 pages.

Roth, et al., "Effective Jump-Pointer Prefetching for Linked Data Structures," ISCA '99m Proceedings of the 26th International Symposium on Computer Architecture, 1999, pp. 111-121.

* cited by examiner

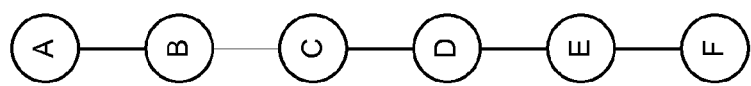
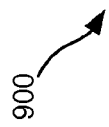
FIG. 9

SYSTEMS, METHODS, AND APPARATUS FOR PREFETCHING NODE DATA FOR LINKED DATA STRUCTURE TRAVERSAL

BACKGROUND

1. Field

The present disclosed embodiments relate generally to computing device communications, and more specifically to apparatus and methods of rendering a webpage.

2. Background

Linked data structures include nodes distributed in memory where each node includes at least one pointer (or link) to another node that identifies a location of another node in memory. Linked lists and tree type linked data structures are two examples of linked data structures. Typically, linked data structures are modified by changing the pointers or links between nodes, while the nodes themselves remain in the same physical location in memory.

Utilizing or modifying a linked data structure is performed via a method called traversal, which involves the computational process of moving through the linked data structure from node to node in a specified order (or traversal order) and processing each node as it is traversed. Traversal order is dictated by a traversal algorithm, which includes a set of ordered rules specifying what type of node is to be traversed next in the traversal order. For instance, one traversal algorithm can, at each node, look for the following types of nodes and traverse to the first of these nodes that exists: (1) first child; (2) next sibling; and (3) closest ancestor's sibling, where children, siblings, and parents are defined via a conceptual representation of a linked data structure such as FIG. 2. If none of these types can be found, then the traversal is complete.

To better illustrate this, we can look at a webpage (FIG. 1) and its underlying document object module (DOM) tree (FIG. 2), which illustrates one instance where a tree type linked data structure is used in practice. FIG. 2 shows a conceptualization of the DOM tree showing parent and child relationships between nodes, but not showing the various links between nodes. FIG. 1 is a simplified webpage having 9 elements 102, 104, 106, 108, 110, 112, 114, 116, 118 that are rendered from a DOM tree illustrated in FIG. 2 having 9 nodes 202, 204, 206, 208, 210, 212, 214, 216, 218. The nodes correspond to the webpage elements as follows: 202→102; 204→104; 206→106; 208→108; 210→110; 212→112; 214→114; 216→116; and 218→118. A webpage element within another element is said to be a 'child' of the containing element. For instance, windows 104 and 110 are within window 102 and are thus the nodes representing these elements are illustrated as children 204, 210 of node 202 in the DOM tree. The containing element (e.g., 202) is known as the 'parent.' A node may have multiple children, but only one parent. Nodes with the same parent node are referred to as 'siblings.' For instance, nodes 204 and 210 are siblings, as are 214 and 216. The node at the top of the tree (e.g., 202), which is the only node without a parent, is referred to as the root node.

Typically, nodes in a linked data structure include a link to one or more of the following nodes: parent, first child, previous child, next sibling, previous sibling. For example, node 204 is a parent to nodes 206 and 208. Nodes 206 and 208 are siblings (although these links are not illustrated in the conceptualization of the tree type linked data structure). Node 208 is a next sibling to node 206 and node 206 is a previous sibling to node 208 (these links are also not illustrated). Nodes 214 and 216 are children of node 206. Node 214 is a first child of node 206 and node 216 is a last child of node 206.

In FIG. 2 one can see that the traversal algorithm described above ((1) first child, (2) next sibling, (3) ancestor's sibling) leads to the following traversal order: 202, 204, 206, 214, 216, 208, 218, 210, 212. For instance, at node 204, the first child is 206 and so the algorithm traverses to node 206. At node 214, there is no first child, but there is a next sibling, node 216. At node 216 there is neither a first child, nor a next sibling, so the algorithm traverses up a chain of parents (ancestors) until a parent's sibling is found. In this case, 208 is a sibling to 206, which is the parent (an ancestor) of 216. As a further example, for node 218, there is neither a first child, nor a next sibling, so the algorithm traverses up the chain of parents until a parent's sibling is found; this happens to be node 210, which is a sibling to node 204 which is a parent of the parent of node 218. Eventually, at node 212, neither a first child, a next sibling, nor a sibling of any parent above node 212 exists, so the algorithm has traversed all nodes in the linked data structure and thus traversal is complete. This exemplary traversal order is unique to the illustrated tree type linked data structure of FIGS. 2 and 8 and unique to the traversal algorithm described earlier in this paragraph. In other embodiments, different traversal orders can result from different types of linked data structures and/or different traversal algorithms.

Traversing linked data structures is applicable in a variety of circumstances, such as the rendering of webpages via traversal of DOM trees, and updating of dynamic web pages via traversal and manipulation of DOM trees. The DOM is a convention used to represent and interact with objects in HTML, XHTML, and XML documents. The DOM presents web documents to a program such as a web browser, or to a web developer during programming, as a tree hierarchy having nodes and relationships between nodes. The DOM can thus be used to analyze, manipulate, and render a web document. The DOM is platform and language agnostic, enabling this convention to be used across a wide range of platforms and software languages.

To render a webpage, most web browsers download the HTML document into memory, and parse it into DOM nodes having relations to each other (e.g., parent, child, sibling), where the nodes and their relations together form a DOM tree. Once the DOM tree has been parsed, the web browser traverses the DOM tree and renders the document (e.g., paint to a display, convert to PDF, present on Braille system, or read aloud via synthesized voice, to name a few non-limiting examples).

When the DOM tree is traversed and data from each node is processed, this data is first temporarily stored in a cache for processing (e.g., a CPU cache). This cache has limited space, and thus large and complex linked data structures (e.g., complex web documents) cannot be buffered as a whole in the cache—instead the linked data structure is temporarily stored piecemeal in cache and processed piecemeal sometimes delaying traversal and manipulation of the linked data structure. In the case of web documents this can mean increased rendering times.

Current attempts to improve the speed of traversal involve prefetching, where node data is loaded from memory into the cache before it is needed. The processor is thus able to read node data from cache rather than from memory, and thus traversal latency is reduced.

Prefetch algorithms can either be carried out in hardware or software. Hardware pretching often involves algorithms that prefetch node data based on a previous traversal path—using heuristics to predict likely accesses often based on recent access patterns. On subsequent traversals, the algorithm can often effectively predict where in memory to find nodes in order to prefetch them into the cache.

Implementing hardware prefetching allows arbitrary prefetching problems to be solved quite effectively but at a power cost and without being tailored to the prefetching—it merely knows that it is accessing memory in a certain pattern. The software on the other hand knows that it is performing linked data structure traversal, so it can be tailored to more efficiently perform this task (e.g., more efficiently guess which node is to be traversed next).

Software-based prefetching has the potential to consume less energy than hardware-based methods, however arbitrary heuristics-based prefetching algorithms are typically not efficient to implement in software and would consume more processing time to train and predict prefetch locations than the benefit that such prefetching would afford. Simple prefetching algorithms have been implemented in software given array type data structures, where any node implies a node memory address for all other nodes in the array. In such a data structure, logically adjacent nodes have adjacent addresses. Thus, if nodes are accessed in order, the address of the next node in the linked data structure (according to a given traversal order) can be inferred since the pattern of node addresses is consistent. However, this implied node memory address does not exist for many types of data structures including a typical DOM tree for a webpage. In these cases, there is little pattern to the address of a next node relative to a previous node in the traversal order.

There is therefore a need in the art for a method to traverse large, complex, and nonlinear linked data structures (e.g., DOM trees) using low-power prefetching.

SUMMARY

Exemplary embodiments of the present invention that are shown in the drawings are summarized below. These and other embodiments are more fully described in the Detailed Description section. It is to be understood, however, that there is no intention to limit the invention to the forms described in this Summary of the Invention or in the Detailed Description. One skilled in the art can recognize that there are numerous modifications, equivalents and alternative constructions that fall within the spirit and scope of the invention as expressed in the claims.

Some embodiments of the disclosure may be characterized as a linked data structure creation and traversal system comprising a node creation module, a traversal module, and a write module. The node creation module can attach a new node to the linked data structure. The traversal module can traverse one node in a reverse traversal order from the new node to a first existing node. The traversal module can also jump to a second existing node, where the second existing node can be located via a first reverse prefetch link of the first existing node. The traversal module can additionally traverse one node in a forward traversal order from the second existing node to a prefetch node. The write module can write a second reverse prefetch link, indicating a location of the prefetch node, to the new node. The write module can also write a forward prefetch link, indicating a location of the new node, to the prefetch node.

Other embodiments of the disclosure may be characterized as a method of assigning prefetch traversal links to nodes in a linked data structure. The method may include determining a prefetch node distance N. The method may further include attaching a new node to the linked data structure. The method may further include traversing the linked data structure one node in a reverse traversal order to a first existing node. The method may yet further include jumping to a second existing node via a reverse prefetch link of the first existing node. The method may further include traversing the linked data structure one node in a forward traversal order to a prefetch node. The method may yet further include assigning a first reverse prefetch link, referencing the prefetch node, to the new node. The method may yet further include assigning a first forward prefetch link, referencing the new node, to the prefetch node.

Yet further embodiments of the disclosure may be characterized as a non-transitory, tangible computer readable storage medium, encoded with processor readable instructions to perform a method for assigning prefetch traversal links to nodes in a linked data structure. The method can include determining a prefetch node distance N and traversing the linked data structure one node in a reverse traversal order to a first existing node. The method can further include jumping to a second existing node via a reverse prefetch link of the first existing node. The method can yet further include traversing the linked data structure one node in a forward traversal order to a prefetch node. The method can further include assigning a first reverse prefetch link, referencing the prefetch node, to the new node and assigning a first forward prefetch link, referencing the new node, to the prefetch node.

Still further embodiments of the disclosure may be characterized as a system for assigning prefetch links to nodes in a linked data structure in order to enhance traversal of the linked data structure. The system can include a node creation module that adds a new node to the linked data structure. The system can further include a means for determining a prefetch node distance N. The system can further include a means for attaching a new node to the linked data structure. The system can yet further include a means for traversing the linked data structure one node in a reverse traversal order to a first existing node. The system can still further include a means for jumping to a second existing node via a reverse prefetch link of the first existing node. The system can yet further include a means for traversing the linked data structure one node in a forward traversal order to a prefetch node. The system further can include a means for assigning a first reverse prefetch link, referencing the prefetch node, to the new node. The system can additionally include a means for assigning a first forward prefetch link, referencing the new node, to the prefetch node.

BRIEF DESCRIPTION OF THE DRAWINGS

FIG. 9 illustrates a doubly linked list or linear linked data structure.

DETAILED DESCRIPTION

The word "exemplary" is used herein to mean "serving as an example, instance, or illustration." Any embodiment described herein as "exemplary" is not necessarily to be construed as preferred or advantageous over other embodiments.

The systems, methods, and apparatus herein disclosed overcome the aforementioned challenges in the art by enabling software-based linked data structure traversal that uses prefetching. In particular, a linked data structure can be created while simultaneously identifying and assigning prefetch links to nodes as they are created. Prefetch links are identified based on a number of nodes, N, or a prefetch distance, that is determined based on estimations of one or more linked data structure traversal and node processing characteristics. Prefetch links are then usable in subsequent traversals to "jump" between nodes and to prefetch node data into processor cache before the processor is ready to process the node data. The process of identifying a prefetch node can include the following operations: (1) attach a new node to the linked data structure; (2) traverse one node in a reverse traversal direction to a first existing node (assuming one exists); (3) jump in the reverse traversal direction to a second existing node via a reverse prefetch link of the second existing node; (4) traverse one node in a forward traversal direction to the prefetch node. Where all four of these operations cannot be completed, a prefetch link may not be assignable. The forward traversal direction and the reverse traversal direction are opposite directions of the traversal order.

Figure 3:
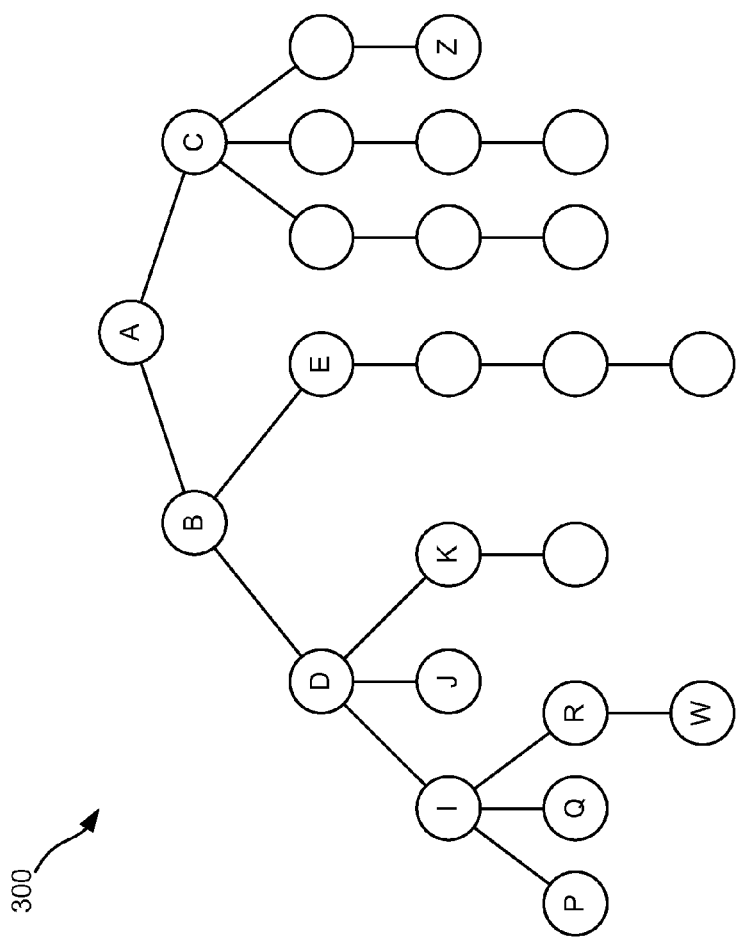
FIG. 3 illustrates another embodiment of a linked data structure.
Figure 8:
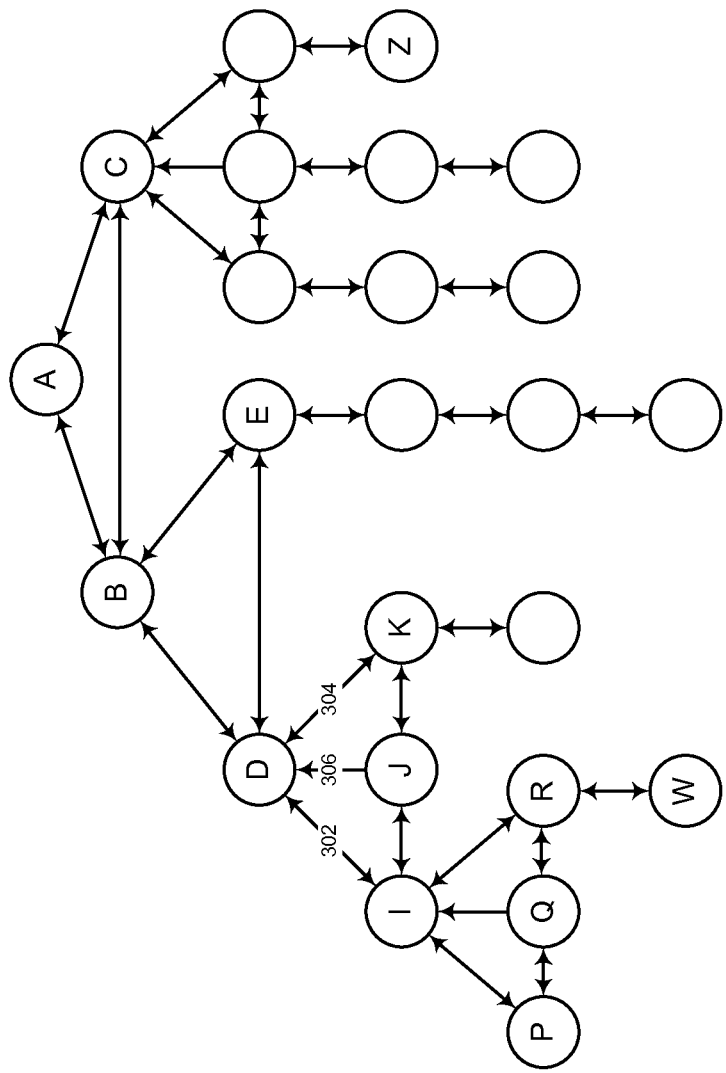
FIG. 8 illustrates an alternative view of the linked data structure of FIG. 3.

To demonstrate this process of identifying prefetch nodes, reference is made to FIGS. 3 and 8, which show a particular implementation of a tree type linked data structure (a doubly linked list is another form of linked data structure as seen in FIG. 9). FIG. 8 illustrates the links between nodes of the tree type linked data structure, while FIG. 3 illustrates the conceptual representation of a tree hierarchy (i.e., the parent and child relationships between nodes). Although the linked data structure includes 24 nodes, for the sake of brevity only a portion of those nodes are illustrated and will be discussed. For this illustration, a prefetch distance, N=4, is assumed, and the traversal algorithm used in the Background is again followed. In particular: (1) first child; (2) next sibling; and (3) ancestor's sibling. Given this traversal algorithm, which is illustrative only, a traversal in the forward traversal order will see node A traversed first, and node Z traversed last. Traversal from Z toward A can be referred to as a reverse traversal order. Because traversal can be forward or backward, there are similarly "forward prefetch links" and "reverse prefetch links". Once the prefetch links are assigned to nodes, the forward prefetch links can be used during forward traversal, and the reverse prefetch links can be used during reverse traversal.

In one embodiment, each node can include links to one or more of the following: parent, first child, last child, next sibling, previous sibling. A first child is a node in a list of siblings which has no previous sibling associated with it. Link 302 (FIG. 8) represents two links: one is a link to the first child of node D, and one is link to the parent of node I. A last child is a node in a list of siblings which has no next sibling associated with it. Link 304 represents two links: one is a link to the last child of node D, and one is a link to the parent of node K. Children which are not first or last children cannot be directly accessed from their parent node. Instead, they must be accessed by first accessing the first or last child of the parent node and then iteratively accessing next or previous sibling links to reach the desired node. For instance, while J is a child of D, J cannot be accessed from D, since J is not a parent, first child, last child, next sibling, or previous sibling to D. Viewed another way, link 306 represents a link from J to D, but not vice versa. To reach J from D, the first child link from D could be followed and then the next sibling link of I (although other paths are also possible). As for siblings, J is a next sibling to I, and J is a previous sibling to K.

The linked data structure of FIG. 8 shows the following links: parents, first children, last children, next siblings, and previous siblings. For instance, node B shows a parent link to node A, a next sibling link to node C, a first child link to node D, and a last child link to node E. As another example, D shows a parent link to B, a next sibling link to E, a first child link to I, and a last child link to K. D does not have a link to J, although J has a parent link to D.

Figure 1:
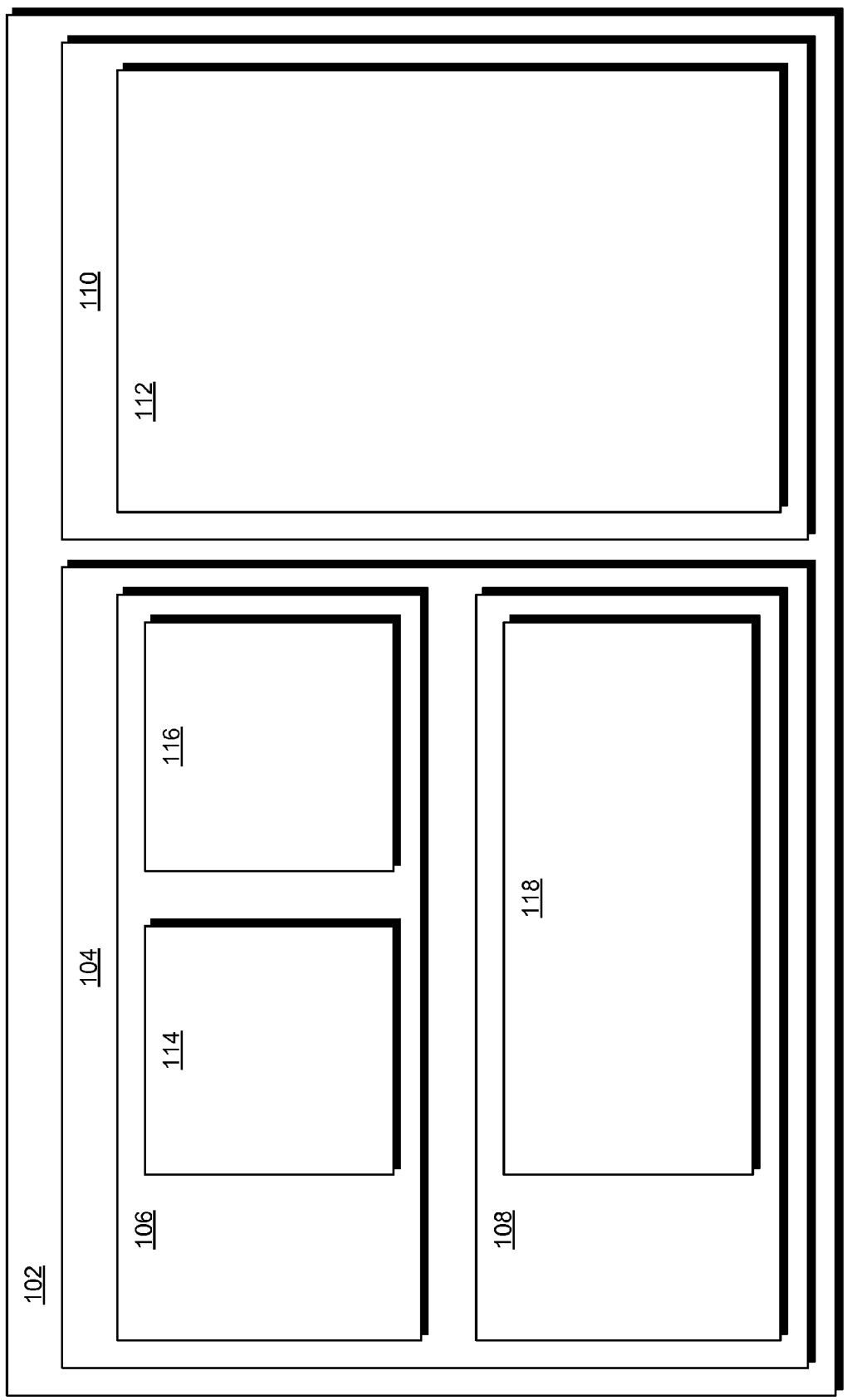
FIG. 1 illustrates a simplified webpage having a plurality of nested elements.
Figure 2:
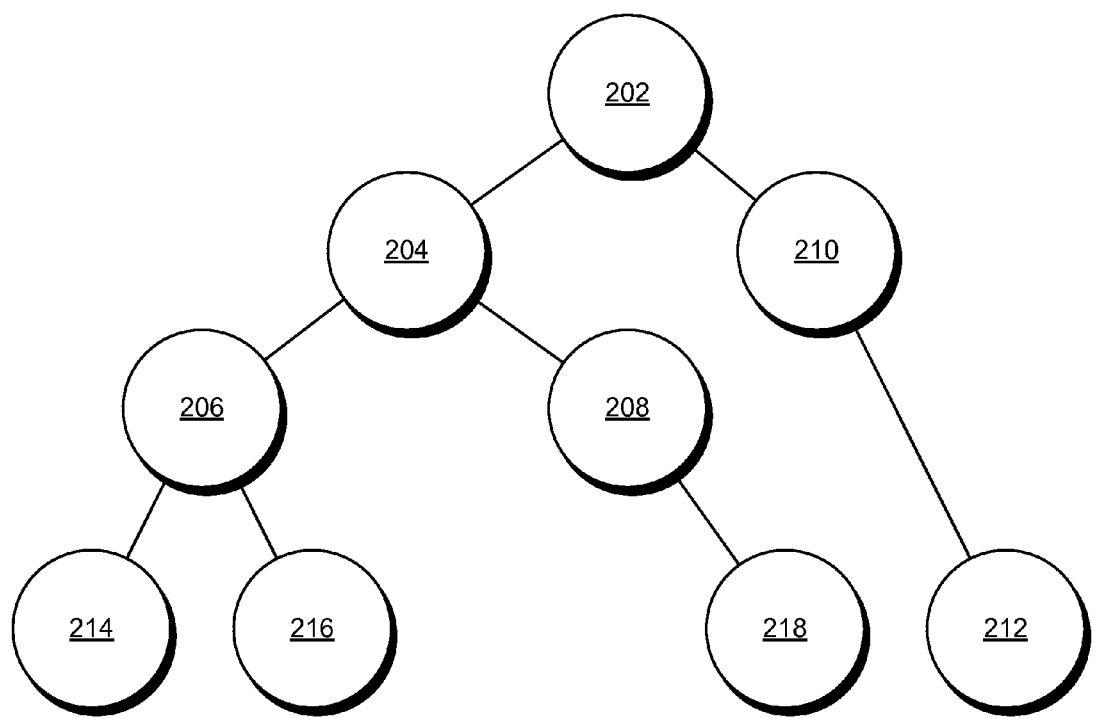
FIG. 2 illustrates a simplified linked data structure visualized in the form of a tree.

Each node can also include a forward prefetch link and reverse prefetch link Exemplary links can be seen in Table 1 for the linked data structure of FIGS. 2 and 8, given the above traversal algorithm, and N=4. For the sake of brevity, only nodes A, B, D, I, P, Q, R, and W are shown in Table 1 and discussed below.

TABLE 1

| Traversal Order | Parent | First Child | Last Child | Next Sibling | Previous Sibling | Forward Prefetch | Reverse Prefetch |
|---|---|---|---|---|---|---|---|
| A | — | B | C | — | — | P | — |
| B | A | D | E | C | — | Q | — |
| D | B | I | K | E | — | R | — |
| I | D | P | R | J | — | W | — |
| P | I | — | — | Q | — | — | A |
| Q | I | — | — | R | P | — | B |
| R | I | W | — | — | Q | — | D |
| W | R | — | — | — | — | — | I |

The forward prefetch node of A, for example, is P, four nodes ahead of A. Similarly, the reverse prefetch of R is D, four nodes in the reverse traversal order from R. During traversal, while node B is being processed, the method can "jump" to node Q via the forward prefetch link of node B, and prefetch node Q's data into the processor cache. Similarly, for a reverse traversal, while node R is being processed, the algorithm can jump to node D via the reverse prefetch link of node R, and prefetch node D's data into the processor cache.

For the purposes of this disclosure, traversing refers to movement between adjacent nodes in a traversal order (e.g., B to D or W to J), while jumping refers to movement between non-adjacent nodes in the traversal order (e.g., B to I or W to K). Note that in some cases, adjacent nodes in the traversal order are not adjacent nodes in the linked data structure (e.g., W to J). At the same time, some non-adjacent nodes in the traversal order are adjacent nodes in the linked data structure (e.g., J and I are non-adjacent in the traversal order yet adjacent in the linked data structure). For instance, J and I are non-adjacent in the traversal order yet adjacent in the linked data structure. J and I are adjacent in the linked data structure because there is a next sibling link from I to J and a previous sibling link from J to I. The ability to jump becomes particularly useful as N increases. This is because the same number of operations are required to identify a prefetch link regardless as to how large N becomes—namely, a one-node traversal, a jump, and a one-node traversal. Thus, the time required to identify a prefetch node is the same whether N=4 or 40, for example.

Figure 6:
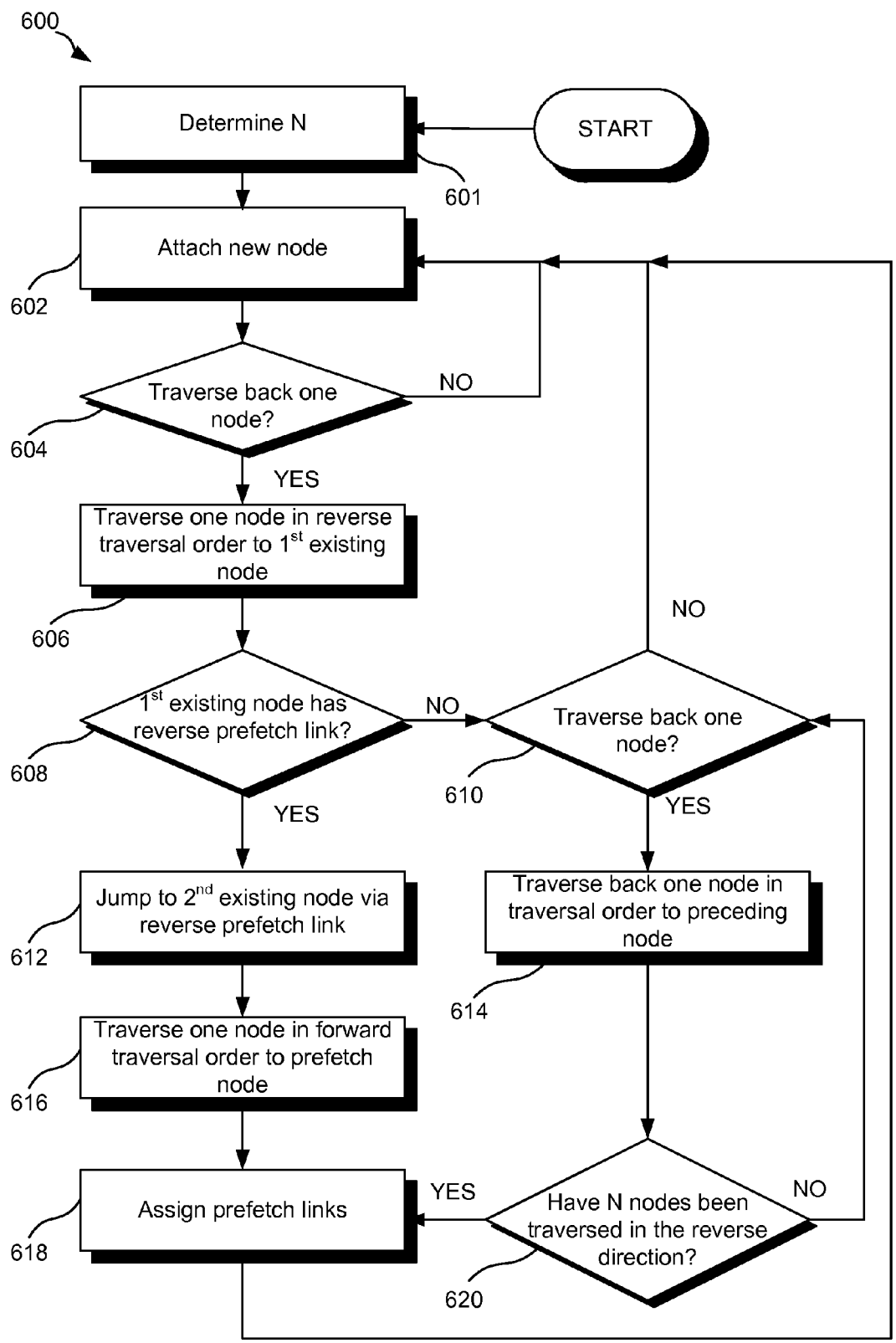
FIG. 6 illustrates a method of identifying and assigning prefetch links to nodes during creation of a linked data structure.

The generalized method described above is further detailed in FIG. 6 and will be described as applied to the exemplary linked data structure as illustrated in FIG. 8. Initially, a prefetch distance N is determined (Block 601), for instance as a function of node traversal latency or other linked data structure traversal and node processing characteristics. A new node is then attached to the linked data structure (Block 602). In this first iteration, node A is the new node. After A is created, the method 600 determines if it is possible to traverse one node in the reverse traversal order (Decision 604).

Unable to find a previous node to A, the method 600 moves on to creation of the next node, node B (Block 602) in a second iteration. The method 600 attaches node B to the linked data structure (Block 602) and then determines whether a traversal of one node in the reverse traversal order from node B is possible (Decision 604). In this case it is, so the method 600 traverses one node in the reverse traversal order to node A (Block 606), also known as a first existing node. The method 600 then determines if node A, the first existing node, has a reverse prefetch link (Decision 608). Node A does not, so the method 600 determines if it is possible to traverse one node further in the reverse traversal direction (Decision 610). This is not possible with node A, so the method 600 loops back to attachment of a new node for a third iteration (Block 602).

Node D is attached (Block 602) and then the method 600 determines if it is possible to traverse back one node from node D (Decision 604). It is possible, so the method 600 traverses one node in the reverse traversal order to node B, which is the first existing node for this iteration (Block 606). The method 600 then determines if node B has a reverse prefetch link (Decision 608), and since it does not, the method 600 determines if it is possible to traverse back one node (Decision 610). This is possible, so the method 600 traverses back one node in the reverse traversal order to node A, a preceding node for this iteration (Block 614). If N (e.g., here N=4) nodes have been traversed in the reverse traversal order (e.g., 4 instances of Block 614), then the prefetch node has been reached (Block 620) and prefetch links can be assigned (Block 618). However, for N=4, and given that the new node is D, N nodes have not been traversed in the reverse traversal order and so the method 600 again determines if reverse traversal one node from node A is possible (Decision 610). It is not, so this third iteration of method 600 ends, and a new node is attached (Block 602) in a fourth iteration.

The new node is node I. Reverse traversal by/of one node is possible (Decision 604), so the method 600 traverses one node back to node D (Block 606) and finds that node D does not have a reverse prefetch link (Decision 608). The method 600 then traverses back one node at a time (Block 614 along with Decisions 620 and 610) until it reaches node A and is unable to traverse in the reverse traversal order any further. This ends the fourth iteration of the method 600 for new node I.

New node P is then attached to the linked data structure 300 (Block 602). Traversal back to node I is possible (Decision 604), so the method 600 traverses back to node I (Block 606), and determines if node I has a prefetch link (Block 608). It does not, so the method 600 again traverses in the reverse traversal order one node at a time (Decision 610, Block 614, Decision 620) and eventually reaches node A having traversed 4 nodes (or N nodes) in the reverse traversal order (Decision 620). Because N nodes have been traversed in the reverse traversal order (Decision 620), node A is identified as the prefetch node to node P, and prefetch links to nodes P and A can be assigned to nodes A and P, respectively (Block 618). This ends the fifth iteration of method 600 where the new node is node P.

New node Q is then attached to the linked data structure (Block 602), the method 600 traverses back to node P (Decision 604 and Block 606), and since a reverse prefetch link was assigned to node P in the fifth iteration, a reverse prefetch link is found to exist in node P (Decision 608). So, the method 600 jumps from node P to node A, a second existing node, using the reverse prefetch link of node P (Block 612). The method 600 then traverses one node in the forward traversal order to the prefetch node of node Q—node B (Block 616). When method 600 reaches this point it can identify node B as the prefetch node to node Q, and assign prefetch links to nodes Q and B. In particular, a forward prefetch link to Q is assigned to B and a reverse prefetch link to B is assigned to Q. This sixth iteration for new node Q thus comes to an end.

All subsequent iterations in this example will appear almost identical to the iteration for node Q—the method 600 will pass through Block 602, Decision 604, Block 606, Decision 608, Block 612, Block 616, and Block 618 for each iteration of a new node being attached to the linked data structure 300.

It can be seen that once prefetch links begin to be assigned to nodes, the process of identifying prefetch links becomes much quicker since a new node can use the reverse prefetch link of the preceding node to 'jump' to the node preceding the prefetch node. In this way, the method 600 need not traverse back N nodes, one node at a time, to reach the prefetch node. The method 600 therefore often involves two traversals and one jump, and these same three steps will be performed regardless as to the magnitude of the prefetch distance N.

Preferably the order of node attachment matches that of any given traversal order. This can enhance performance and also help to avoid prefetch links that point to other than the prefetch node. The exemplary traversal algorithm discussed above matches a construction order for XML/HTML documents that are linearly parsed from start to finish.

The prefetch distance N can be determined based on estimations of one or more linked data structure traversal and node processing characteristics. For instance, in one embodiment, N can be calculated based on a combination (e.g., weighted average) of the following: (1) an average time that it would take to traverse to the $N^{th}$ node; and (2) an average time that it would take to prefetch the node data from memory into processor cache. In one embodiment, N can be based on the longer of (1) and (2). In one embodiment, N can be based on either (1) or (2) rather than a combination of the two. The average time for both factors can, in an embodiment, be a function of processor cycles. In one embodiment, N is 7 nodes.

In another embodiment, N can be empirically derived. For instance, a traversal algorithm can be executed on a sample document and timing performance for various values of N can be recorded. N can be selected based on various metrics such as speed, performance, best absolute worst-case, best absolute best-case, etc.

The traversal operations (e.g., Blocks 606, 614, 616) each involve a traversal from one node to an adjacent node in the traversal order. However, since the traversal order sometimes includes movement between non-adjacent nodes in the linked data structure, each traversal of a single node can include accessing intermediary nodes in order to find a linked path to the next node or the previous node in the traversal order. For instance, while J is the next node relative to W in the traversal order, to reach J via the exemplary traversal order, the method 600 accesses nodes R, then I, and then J to perform the traversal of a single node in the traversal order from node W to node J.

It should be noted again that the illustrated traversal order, and the traversal algorithm leading to this order, show one of many examples, and are not intended to be the sole traversal order that can be implemented. Instead, the terms forward and reverse traversal order apply generally to any traversal order implemented. Furthermore, the structure of the illustrated linked data structure 300 is also merely illustrative, and the systems and methods herein described apply equally well to any of a variety of different linked data structures. The method steps illustrated in FIG. 6, in some embodiments, can be interchanged without departing from the scope of the invention. Furthermore, alternative embodiments can include different links and/or different types of links.

For XML/HTML, first and last children are determined by location in a document (e.g., first child is the first child encountered in the document after the beginning of the parent element and a last child is the last child encountered before an end of the parent element). Yet, what is deemed a first and last child will depend on the particular data structure.

Additionally, the linked data structure should be built appropriately so that elements are represented in the order in which they appear in the document. Other data representations and parsers may behave differently than exemplified above, and the meaning of first and last child or sibling links, or any other type of link, may be defined by the given implementation and may vary from embodiment to embodiment.

Figure 4:
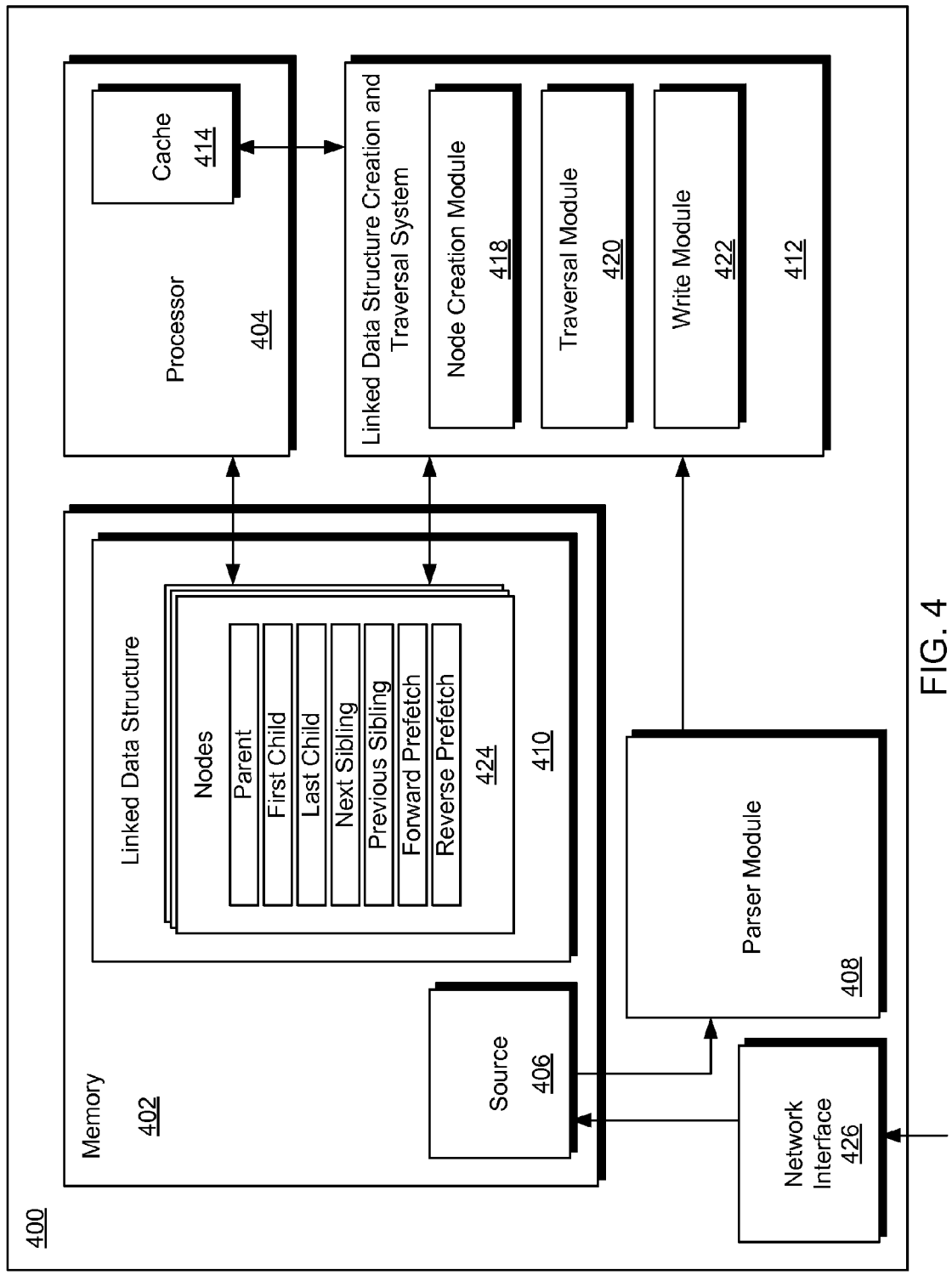
FIG. 4 illustrates a system for assigning prefetch links to nodes during linked data structure creation and for using those prefetch links to improve traversal efficiency.

FIG. 4 illustrates a system 400 for assigning prefetch links to nodes during linked data structure creation and for using those prefetch links to improve traversal efficiency. In this embodiment, the system 400 includes a network interface 426 providing source data 406, downloaded from a remote web server, or other remote data source, that can be parsed by a parser module 408 and then formed into a linked data structure 410 by a linked data structure creation and traversal system 412. The linked data structure creation and traversal system 412 can identify prefetch nodes while creating the linked data structure 410, and assign prefetch links to nodes 424 as the nodes are created and attached to the linked data structure 410. The same can also be performed when the linked data structure 410 is updated or modified.

The linked data structure creation and traversal system 412 can include a node creation module 418, a traversal module 420, and a write module 422. These modules can be embodied in hardware, software, firmware, or a combination of these. The node creation module can create nodes 424 and add them to the linked data structure 410. The traversal module 420 can identify prefetch links as the nodes 424 are created or modified, and later use the prefetch links to more efficiently traverse the linked data structure 410 on subsequent traversals. The write module 422 can assign or write the prefetch links to nodes 424 as the nodes 424 are created or modified. The linked data structure 410 can include a plurality of nodes 424 and each of the nodes 424 can include one or more of the following links: parent, first child, last child, next sibling, previous sibling, forward prefetch, reverse prefetch.

To identify prefetch nodes, the traversal module 420 performs a one-node traversal in the reverse traversal order, a jump based on a prefetch link of a preceding node, and a one-node traversal in the forward traversal order. These three steps can be carried out starting from each new node as each new node is created by the node creation module 418. In more detail, these three steps involve the traversal module 420 traversing the linked data structure 410 one node in a reverse traversal order to a first existing node from a new node (if possible). In some cases, a previous node does not exist, such as in the case of node A in FIG. 3. The traversal module 420 then reads a reverse prefetch link of the first existing node (if one exists) and follows the link to a reverse prefetch node of the first existing node, which can be called a second existing node. Some nodes will not have a prefetch link (e.g., nodes A, B, D, and I in the example), but if there is one, then the traversal module 420 can "jump" to a second existing node using a location indicated by the reverse prefetch link. For example, node A is the second existing node when node P is the new node and assuming the previously discussed traversal order.

The traversal module 420 can then traverse one node in the forward traversal direction from the second existing node to the prefetch node. Once the traversal module 420 has reached and located the prefetch node, the write module 422 can write a reverse prefetch link, indicating a location of the prefetch node, to the new node. The write module 422 also writes a forward prefetch link, indicating a location of the new node, to a forward prefetch field of the prefetch node. These operations continue until all nodes in the linked data structure are created.

During subsequent traversals, the linked data structure creation and traversal system 412 can use prefetch links that it assigned to the nodes 424 to prefetch node data into a cache 414 of a processor 404 before the processor 404 is ready to process a given node. This prefetching helps the processor 404 to operate more efficiently since it can read prefetched data from its cache 414 faster than it can read node data from the memory 402.

As an example of prefetching during traversal in the forward traversal order, the processor 404 may process a first node's data while the processor's memory interface—as directed by the linked data structure creation and traversal system 412—prefetches data for a second node from the memory 402 into the processor's 404 cache 414. Although the linked data structure creation and traversal system 412 can direct or suggest that the processor's memory interface prefetch data for the second node, the processor 404 has ultimate control over whether it prefetches the data or not. The location of the second node's data can be indicated by a forward prefetch link of the first node. In other words, the processor 404 processes a node's data while the linked data structure creation and traversal system 412 prefetches node data for a node N nodes ahead.

As noted above, each node can include one or more of the following links: parent, first child, last child, next sibling, and previous sibling. In some embodiments, a node may include data fields for each of these five possible links. Further, a value may be written to one or more of these fields, such that some nodes may have values for the first child and last child links, while another merely has a value for the parent link.

In some cases, the value assigned to a field may be a valid but "nonideal" link, such as a link to an existing node that is other than the correct node. For instance, while J is the next sibling to I, I may have a link written to its next sibling field that points to node E. Other values assigned to fields may be ideal values since they point to the correct node. A field can be empty or filled with a value that indicates an empty field (e.g., a "0" or NULL in C/C++). In some cases, one of the nodes 424 can include all of the links (parent, first child, last child, next sibling, previous sibling), thus in many cases, a node will only have some of these links populated. For instance, given lists, outlines, or forums, many nodes will have all their links populated. Prefetch links can sometimes be "invalid links" meaning that they point to a node other than the prefetch node or do not point to a node at all.

The linked data structure 410 is illustrated as being separate from the memory 402 and the processor 404. However, one of skill in the art will recognize that, in an embodiment, the linked data structure creation and traversal system 412 can reside on the memory 402 and/or run on the processor 404.

Figure 5:
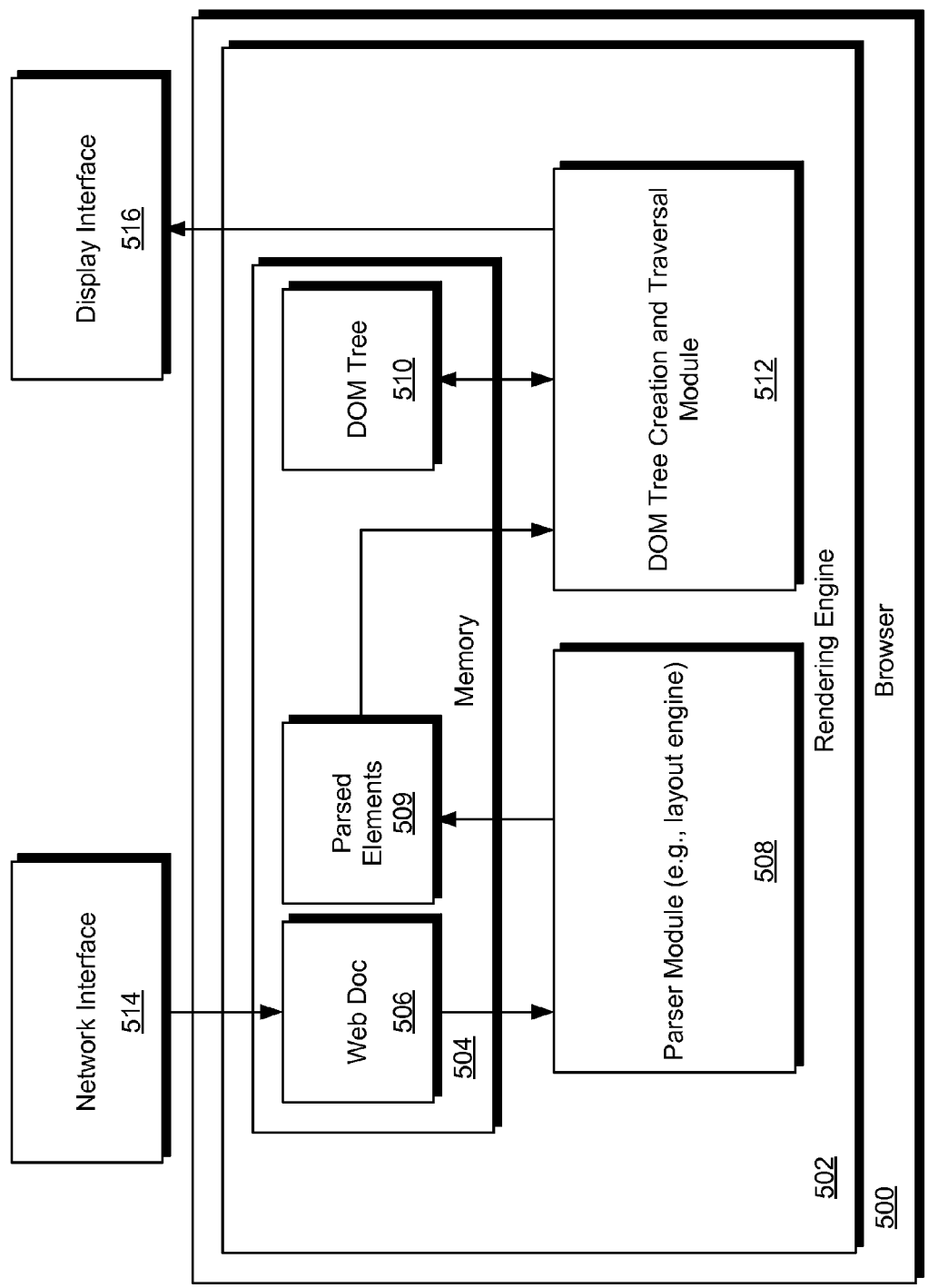
FIG. 5 illustrates another system for assigning prefetch links to nodes during linked data structure creation and for using those prefetch links to improve traversal efficiency.

FIG. 5 illustrates another system for assigning prefetch links to nodes during linked data structure creation and for using those prefetch links to improve traversal efficiency. This embodiment is implemented in a web browser 500 having a rendering engine 502 configured to receive webpage data, process the data into a DOM tree, and rendering the DOM tree (e.g., paint to a display, convert to PDF, present on Braille system, or read aloud via synthesized voice, to name a few non-limiting examples). Web documents, such as a web page, are downloaded via a network interface 514. The web doc 506 is then stored in a memory 504 of a browser 500. The browser 500 can include a rendering engine 502 that is responsible for rendering the web doc (e.g., a webpage). A parser module 508, such as a layout engine, can parse the web doc 506 into a plurality of parsed elements 509. A DOM tree creation and traversal module 512 can then create a DOM tree 510 from the plurality of parsed elements 509. The DOM tree creation and traversal module 512 can identify prefetch nodes and assign prefetch links to nodes as they are created and attached to the DOM tree 510.

Once the DOM tree 510 has been created, the DOM tree creation and traversal module 512 can traverse the DOM tree 510 and provide data to the display interface 516 for displaying the webpage on a display. This traversal can be performed with the help of prefetching as described with reference to the method 600. In particular, as the DOM tree creation and traversal module 512 traverses a node of the DOM tree 510 in a forward traversal direction, it can read a forward prefetch link of the node and use the forward prefetch link found in the node to prefetch node data to a processor cache (not illustrated) before the processor is ready to process the node data.

Updates to the webpage or dynamic data may subsequently arrive via the network interface 514, be stored in the memory 504, parsed by the parser module 508, and used by the DOM tree creation and traversal module 512 to update the DOM tree 510. During such updates, the DOM tree 510 is traversed, and such traversal can be expedited via use of the prefetch links. Furthermore, during and after updating of the DOM tree 510, the DOM tree creation and traversal module 512 can update appropriate prefetch links in the nodes to account for the changes to the DOM tree 510.

The memory 504 may be a portion of memory (e.g., RAM) that the rendering engine 502 is allocated by an operating system. The parser module 508 and the DOM tree creation and traversal module 512 may reside on this same memory 504, or a separate region of system memory.

The exemplary systems and methods described herein have been described for embodiments where a linked data structure is created in the same order as the traversal order. In other words, a next node attached to a linked data structure is a next node in a traversal order of the completed linked data structure. The exemplary systems and methods described herein have also often been described for embodiments where the linked data structure is a tree structure. However, and as seen in the doubly linked list or linear type linked data structure of FIG. 9, the herein described systems and methods are not limited to tree type linked data structures, but rather can be applied to any type of linked data structure with reversible traversal order or orders. In other words, the following operations for identifying a prefetch node can be applied to any linked data structure even if it is not described by a tree structure: (1) attach a new node to the linked data structure; (2) traverse one node in a reverse traversal direction to a first existing node (assuming one exists); (3) jump in the reverse traversal direction to a second existing node via a reverse prefetch link of the second existing node; and (4) traverse one node in a forward traversal direction to the prefetch node.

FIG. 9 illustrates a doubly linked list or linear type linked data structure. Each node in a doubly linked list except the first and last nodes (nodes A and F in this example) has two links—a forward link and a reverse link. A traversal order for a doubly linked list is typically linear—for instance, A to B to C to D to E to F or the reverse of this traversal order.

Figure 7:
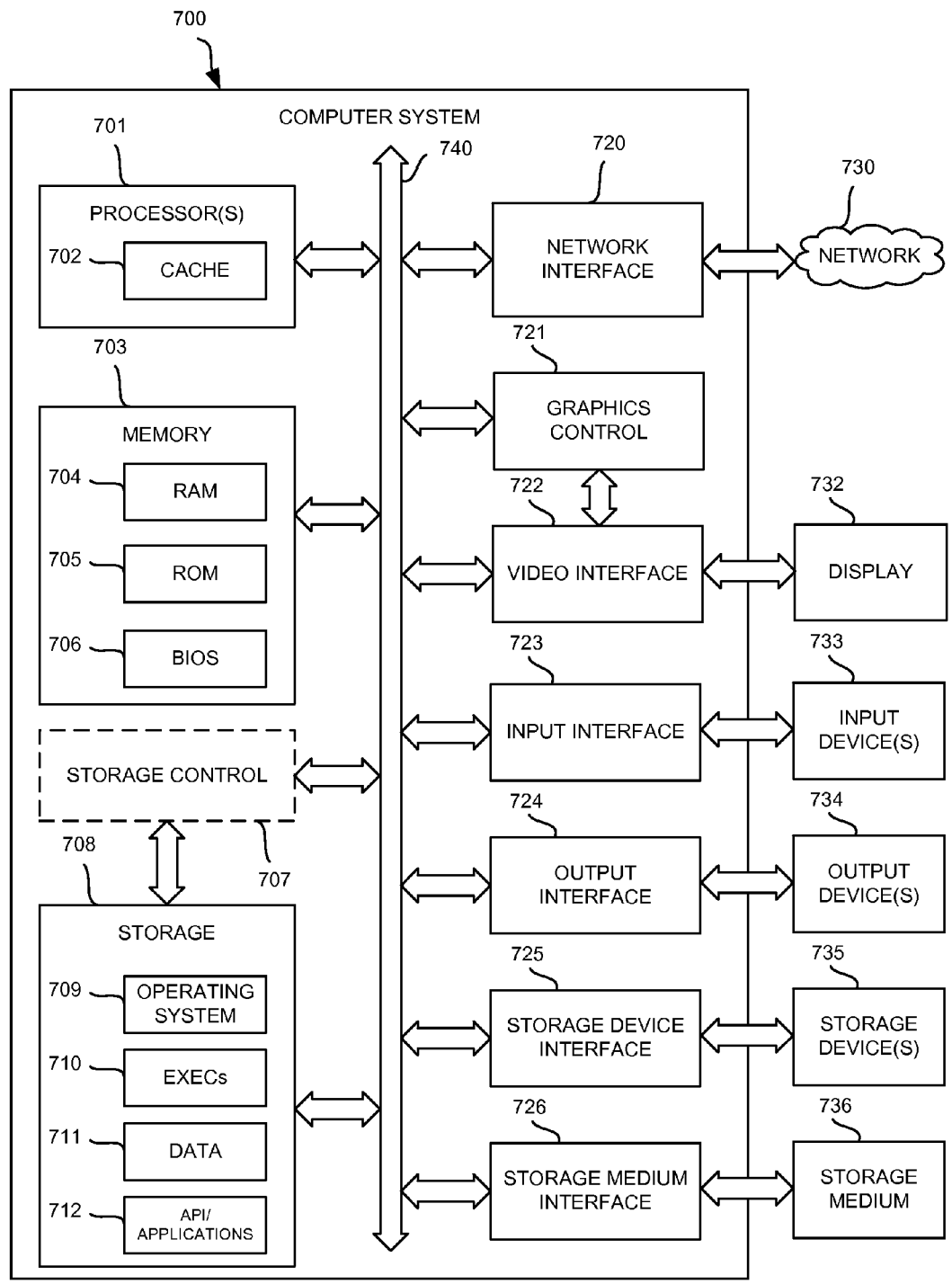
FIG. 7 illustrates a diagrammatic representation of one embodiment of a machine in the exemplary form of a computer system.

The systems and methods described herein can be implemented in a machine such as a computer system in addition to the specific physical devices described herein. FIG. 7 shows a diagrammatic representation of one embodiment of a machine in the exemplary form of a computer system 700 within which a set of instructions can execute for causing a device to perform or execute any one or more of the aspects and/or methodologies of the present disclosure. The components in FIG. 7 are examples only and do not limit the scope of use or functionality of any hardware, software, embedded logic component, or a combination of two or more such components implementing particular embodiments.

Computer system 700 may include a processor 701, a memory 703, and a storage 708 that communicate with each other, and with other components, via a bus 740. The bus 740 may also link a display 732, one or more input devices 733 (which may, for example, include a keypad, a keyboard, a mouse, a stylus, etc.), one or more output devices 734, one or more storage devices 735, and various tangible storage media 736. All of these elements may interface directly or via one or more interfaces or adaptors to the bus 740. For instance, the various tangible storage media 736 can interface with the bus 740 via storage medium interface 726. Computer system 700 may have any suitable physical form, including but not limited to one or more integrated circuits (ICs), printed circuit boards (PCBs), mobile handheld devices (such as mobile telephones or PDAs), laptop or notebook computers, distributed computer systems, computing grids, or servers.

Processor(s) 701 (or central processing unit(s) (CPU(s))) optionally contains a cache memory unit 702 for temporary local storage of instructions, data, or computer addresses. Processor(s) 701 are configured to assist in execution of computer readable instructions. Computer system 700 may provide functionality as a result of the processor(s) 701 executing software embodied in one or more tangible computer-readable storage media, such as memory 703, storage 708, storage devices 735, and/or storage medium 736. The computer-readable media may store software that implements particular embodiments, and processor(s) 701 may execute the software. Memory 703 may read the software from one or more other computer-readable media (such as mass storage device(s) 735, 736) or from one or more other sources through a suitable interface, such as network interface 720. The software may cause processor(s) 701 to carry out one or more processes or one or more steps of one or more processes described or illustrated herein. Carrying out such processes or steps may include defining data structures stored in memory 703 and modifying the data structures as directed by the software.

The memory 703 may include various components (e.g., machine readable media) including, but not limited to, a random access memory component (e.g., RAM 704) (e.g., a static RAM "SRAM", a dynamic RAM "DRAM, etc.), a read-only component (e.g., ROM 705), and any combinations thereof. ROM 705 may act to communicate data and instructions unidirectionally to processor(s) 701, and RAM 704 may act to communicate data and instructions bidirectionally with processor(s) 701. ROM 705 and RAM 704 may include any suitable tangible computer-readable media described below. In one example, a basic input/output system 706 (BIOS), including basic routines that help to transfer information between elements within computer system 700, such as during start-up, may be stored in the memory 703.

Fixed storage 708 is connected bidirectionally to processor(s) 701, optionally through storage control unit 707. Fixed storage 708 provides additional data storage capacity and may also include any suitable tangible computer-readable media described herein. Storage 708 may be used to store operating system 709, EXECs 710 (executables), data 711, API applications 712 (application programs), and the like. Often, although not always, storage 708 is a secondary storage medium (such as a hard disk) that is slower than primary storage (e.g., memory 703). Storage 708 can also include an optical disk drive, a solid-state memory device (e.g., flash-based systems), or a combination of any of the above. Information in storage 708 may, in appropriate cases, be incorporated as virtual memory in memory 703.

In one example, storage device(s) 735 may be removably interfaced with computer system 700 (e.g., via an external port connector (not shown)) via a storage device interface 725. Particularly, storage device(s) 735 and an associated machine-readable medium may provide nonvolatile and/or volatile storage of machine-readable instructions, data structures, program modules, and/or other data for the computer system 700. In one example, software may reside, completely or partially, within a machine-readable medium on storage device(s) 735. In another example, software may reside, completely or partially, within processor(s) 701.

Bus 740 connects a wide variety of subsystems. Herein, reference to a bus may encompass one or more digital signal lines serving a common function, where appropriate. Bus 740 may be any of several types of bus structures including, but not limited to, a memory bus, a memory controller, a peripheral bus, a local bus, and any combinations thereof, using any of a variety of bus architectures. As an example and not by way of limitation, such architectures include an Industry Standard Architecture (ISA) bus, an Enhanced ISA (EISA) bus, a Micro Channel Architecture (MCA) bus, a Video Electronics Standards Association local bus (VLB), a Peripheral Component Interconnect (PCI) bus, a PCI-Express (PCI-X) bus, an Accelerated Graphics Port (AGP) bus, HyperTransport (HTX) bus, serial advanced technology attachment (SATA) bus, and any combinations thereof.

Computer system 700 may also include an input device 733. In one example, a user of computer system 700 may enter commands and/or other information into computer system 700 via input device(s) 733. Examples of an input device(s) 733 include, but are not limited to, an alpha-numeric input device (e.g., a keyboard), a pointing device (e.g., a mouse or touchpad), a touchpad, a joystick, a gamepad, an audio input device (e.g., a microphone, a voice response system, etc.), an optical scanner, a video or still image capture device (e.g., a camera), and any combinations thereof. Input device(s) 733 may be interfaced to bus 740 via any of a variety of input interfaces 723 (e.g., input interface 723) including, but not limited to, serial, parallel, game port, USB, FIREWIRE, THUNDERBOLT, or any combination of the above.

In particular embodiments, when computer system 700 is connected to network 730, computer system 700 may communicate with other devices, specifically mobile devices and enterprise systems, connected to network 730. Communications to and from computer system 700 may be sent through network interface 720. For example, network interface 720 may receive incoming communications (such as requests or responses from other devices) in the form of one or more packets (such as Internet Protocol (IP) packets) from network 730, and computer system 700 may store the incoming communications in memory 703 for processing. Computer system 700 may similarly store outgoing communications (such as requests or responses to other devices) in the form of one or more packets in memory 703 and communicated to network 730 from network interface 720. Processor(s) 701 may access these communication packets stored in memory 703 for processing.

Examples of the network interface 720 include, but are not limited to, a network interface card, a modem, and any combination thereof. Examples of a network 730 or network segment 730 include, but are not limited to, a wide area network (WAN) (e.g., the Internet, an enterprise network), a local area network (LAN) (e.g., a network associated with an office, a building, a campus or other relatively small geographic space), a telephone network, a direct connection between two computing devices, and any combinations thereof. A network, such as network 730, may employ a wired and/or a wireless mode of communication. In general, any network topology may be used.

Information and data can be displayed through a display 732. Examples of a display 732 include, but are not limited to, a liquid crystal display (LCD), an organic liquid crystal display (OLED), a cathode ray tube (CRT), a plasma display, and any combinations thereof. The display 732 can interface to the processor(s) 701, memory 703, and fixed storage 708, as well as other devices, such as input device(s) 733, via the bus 740. The display 732 is linked to the bus 740 via a video interface 722, and transport of data between the display 732 and the bus 740 can be controlled via the graphics control 721.

In addition to a display 732, computer system 700 may include one or more other peripheral output devices 734 including, but not limited to, an audio speaker, a printer, and any combinations thereof. Such peripheral output devices may be connected to the bus 740 via an output interface 724. Examples of an output interface 724 include, but are not limited to, a serial port, a parallel connection, a USB port, a FIREWIRE port, a THUNDERBOLT port, and any combinations thereof.

In addition or as an alternative, computer system 700 may provide functionality as a result of logic hardwired or otherwise embodied in a circuit, which may operate in place of or together with software to execute one or more processes or one or more steps of one or more processes described or illustrated herein. Reference to software in this disclosure may encompass logic, and reference to logic may encompass software. Moreover, reference to a computer-readable medium may encompass a circuit (such as an IC) storing software for execution, a circuit embodying logic for execution, or both, where appropriate. The present disclosure encompasses any suitable combination of hardware, software, or both.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A linked data structure creation and traversal system comprising:
   a processor;
   a node creation module that attaches a new node to the linked data structure;
   a traversal module that:
      traverses one node in a reverse traversal order from the new node to a first existing node;
      jumps to a second existing node, the second existing node located via a first reverse prefetch link of the first existing node;
      traverses one node in a forward traversal order from the second existing node to a prefetch node;
   a write module that writes:
      a second reverse prefetch link, indicating a location of the prefetch node, to the new node; and
      a forward prefetch link, indicating a location of the new node, to the prefetch node
   wherein a prefetch distance, N, separating the first existing node from the second existing node, is a function of an average time required for the traversal module to traverse N nodes, and wherein the node creation module, the traversal module, and write module are executed by the processor.

2. The linked data structure creation and traversal system of claim 1, wherein the linked data structure is a tree type linked data structure.

3. The linked data structure creation and traversal system of claim 2, wherein the tree type linked data structure is a document object model (DOM) tree.

4. The linked data structure creation and traversal system of claim 1, wherein the linked data structure is a doubly linked list type linked data structure.

5. The linked data structure creation and traversal system of claim 1, wherein N is a function of an average time required to prefetch node data from memory into cache of a processor.

6. The linked data structure creation and traversal system of claim 1, wherein the traversal module traverses the linked data structure by:
   reading first node data from the cache of a processor, the first node data being data from the prefetch node;
   reading the forward prefetch link of the prefetch node;
   prefetching second node data from the memory into the cache of the processor before the processor is ready to read the second node data, the second node data being data from a the new node; and
   reading the second node data from the cache of the processor.

7. The linked data structure creation and traversal system of claim 1, wherein the node creation module is configured to remove a node from the linked data structure.

8. The linked data structure creation and traversal system of claim 7, wherein the node creation module is further configured to add a node to the linked data structure after removing a node from the linked data structure.

9. A method of assigning prefetch traversal links to nodes in a linked data structure, the method comprising:
   determining a prefetch node distance N;
   wherein the prefetch node distance N is a function of an average time rewired to traverse N nodes
   attach a new node to the linked data structure;
   traversing the linked data structure one node in a reverse traversal order to a first existing node;
   jumping to a second existing node via a reverse prefetch link of the first existing node;
   traversing the linked data structure one node in a forward traversal order to a prefetch node;
   assigning a first reverse prefetch link, referencing the prefetch node, to the new node; and
   assigning a first forward prefetch link, referencing the new node, to the prefetch node.

10. The method of claim 9, further comprising:
   adding a second new node to the linked data structure; and
   determining that the second new node does not have a reverse traversal link.

11. The method of claim 9, further comprising:
   adding a second new node to the linked data structure;
   traversing the linked data structure one node in the reverse traversal order to a third existing node; and
   determining that the third existing node does not have a reverse prefetch link.

12. The method of claim 11, further comprising:
   traversing N nodes in the reverse traversal order to a second prefetch node; and
   assigning a second reverse prefetch link, referencing the second prefetch node, to the second new node; and
   assigning a second forward prefetch link, referencing the second new node, to the second prefetch node.

13. The method of claim 9, wherein the prefetch node distance N is a function of node traversal latency.

14. The method of claim 9, wherein the prefetch node distance N is further a function of an average time required to prefetch node data from memory into cache.

15. The method of claim 9, wherein the linked data structure is a tree type linked data structure.

16. A non-transitory, tangible computer readable storage medium, encoded with processor readable instructions to perform a method for assigning prefetch traversal links to nodes in a linked data structure, the method comprising:
   determining a prefetch node distance N;
   wherein N is calculated based on an average time required to traverse N nodes
   attach a new node to the linked data structure;
   traversing the linked data structure one node in a reverse traversal order to a first existing node;
   jumping to a second existing node via a reverse prefetch link of the first existing node;
   traversing the linked data structure one node in a forward traversal order to a prefetch node;
   assigning a first reverse prefetch link, referencing the prefetch node, to the new node; and
   assigning a first forward prefetch link, referencing the new node, to the prefetch node.

17. The non-transitory, tangible computer readable storage medium of claim 16, further comprising traversing the linked data structure using the prefetch link of the prefetch node to prefetch data of the prefetch node into a cache of a processor while the processor is processing data for another node.

18. The non-transitory, tangible computer readable storage medium of claim 17, wherein the second existing node is N nodes in a reverse traversal direction from the first existing node.

19. A system for assigning prefetch links to nodes in a linked data structure in order to enhance traversal of the linked data structure, the system comprising:
   a node creation module that adds a new node to the linked data structure;
   a means for determining a prefetch node distance N wherein the prefetch node distance N is a function of an average time required to traverse N nodes;
   a means for attaching a new node to the linked data structure;
   a means for traversing the linked data structure one node in a reverse traversal order to a first existing node;
   a means for jumping to a second existing node via a reverse prefetch link of the first existing node;
   a means for traversing the linked data structure one node in a forward traversal order to a prefetch node;
   a means for assigning a first reverse prefetch link, referencing the prefetch node, to the new node; and
   a means for assigning a first forward prefetch link, referencing the new node, to the prefetch node.

20. The system of claim 19, wherein the linked data structure is a tree type linked data structure.

* * * * *